United States Patent
Körber et al.

[11] Patent Number: 5,884,799
[45] Date of Patent: Mar. 23, 1999

[54] CONTAINER FOR THE INTERIOR OF A VEHICLE

[75] Inventors: Jürgen Körber; Tilo Volkmann, both of Sindelfingen; Jürgen Chaloupka, Wetter 4, all of Germany

[73] Assignee: Daimler-Benz Aktiengesellschaft, Stuttgart, Germany

[21] Appl. No.: 967,943

[22] Filed: Nov. 12, 1997

[30] Foreign Application Priority Data

Nov. 12, 1996 [DE] Germany ............. 196 46 645.8

[51] Int. Cl.⁶ ..................................... B65D 43/20
[52] U.S. Cl. .................. 220/348; 220/351; 220/345.3; 220/345.4; 224/539; 224/275
[58] Field of Search ..................... 220/335, 336, 220/345.1, 345.2, 345.3, 348, 345.4, 350, 351; 224/539, 275, 281

[56] References Cited

U.S. PATENT DOCUMENTS

| | | | |
|---|---|---|---|
| 2,338,192 | 1/1944 | Martin | 220/345.3 |
| 4,688,695 | 8/1987 | Hirohata | 220/336 |
| 4,804,238 | 2/1989 | Bischof et al. | 220/348 X |
| 4,982,843 | 1/1991 | Jones | 220/345.2 X |
| 5,067,625 | 11/1991 | Numata | 220/335 X |
| 5,107,990 | 4/1992 | Wicherski et al. | 220/345.2 X |
| 5,400,914 | 3/1995 | Lin . | |
| 5,531,346 | 7/1996 | Mosior | 220/345.3 X |
| 5,639,002 | 6/1997 | Weitbrecht et al. | 220/335 X |

FOREIGN PATENT DOCUMENTS

| | | |
|---|---|---|
| 38 44 022 | 2/1990 | Germany . |
| 42 18 445 | 12/1993 | Germany . |

*Primary Examiner*—Stephen K. Cronin
*Assistant Examiner*—Nathan Newhouse
*Attorney, Agent, or Firm*—Evenson, McKeown, Edwards & Lenahan P. L. L. C.

[57] ABSTRACT

A container for an installation into the interior of a vehicle, having a box with a box opening situated on top and a closing part covering it. For a compact construction of the container and a simplified installation mounting, the closing part comprises a guide plate, which rests inside the box opening and covers it partially, and a sliding lid which can be displaced in parallel thereto. On its transverse edge, which extends transversely to the sliding direction of the sliding lid, the guide plate is swivellably held on the upper edge of the box and is prestressed by a spring in a swivelling direction pointing away from the box bottom. The sliding lid is, on one side, guided in the sliding direction and with play in each transverse direction thereto on the guide plate and, on the other side, is guided via a connecting link guide on the box.

14 Claims, 2 Drawing Sheets

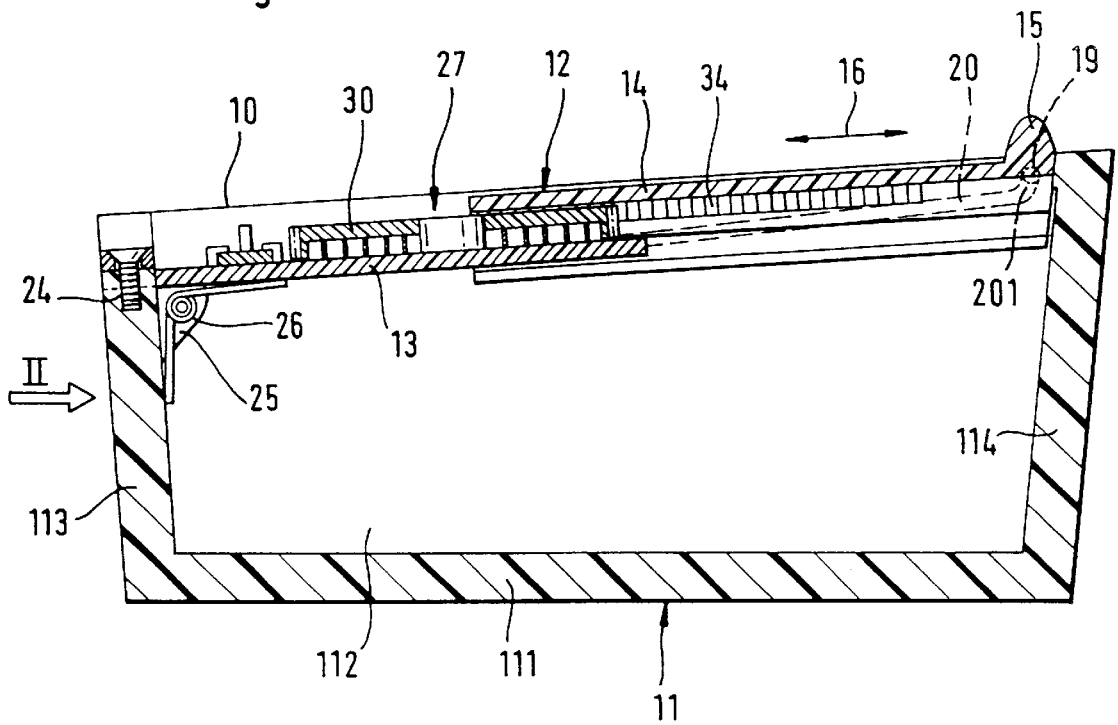

CONTAINER FOR THE INTERIOR OF A VEHICLE

BACKGROUND AND SUMMARY OF THE INVENTION

The invention relates to a container for an installation into an installation opening, particularly in the interior of a vehicle.

In the case of a container for an installation into an installation opening in the interior of a vehicle known from German Patent Document DE 42 18 445 A1, the closing part adapted to the connecting contour of the installation opening reaches over the lateral parts of the box by means of two laterally bent guiding surfaces. Between each guiding surface and each lateral part, a crank is arranged whose one crank pin arranged on an end of a crank arm engages in a bearing bore in the lateral part of the box, and whose second crank pin arranged on the other end of the crank arm engages in a bearing bore in the guiding surface of the closing part. A first tooth segment is arranged on the exterior surfaces of the lateral part, and a second tooth segment is arranged on the guiding surface reaching over the lateral part. The two tooth segments are in a forced engagement with one another. This forced engagement and the course of the movement of the curved closing part during the opening and closing is forced by the crank. Between the closing part and the box, a coil spring is arranged which drives the closing part in the opening direction and is prestressed during the closing movement of the closing part. In the area of the crank pin projecting in the bearing bore in the lateral part, the coil spring is concentrically held on the crank. In addition, a viscose brake is provided which operates between the guiding surfaces of the closing part and the lateral part of the box and dampens the opening movement of the closing part. Finally, there is a detent device with a heart-shaped detent connecting link on the lateral part and a detent pin which projects from the guiding surface of the closing part and, close to the closing position of the closing part, moves into the detent connecting link and locks the closing part there. By the exercising of pressure onto the closing part in the closing direction, the detent pin is lifted out of the detent position, in which case the detent cam arranged on a detent lever swivels and releases the detent pin for the return so that, under the effect of the tensioned coil spring, the closing part is changed into the opening position.

This known container with the forced parallel guiding of the closing part and the spring-wound motor for one moving direction of the closing part, as well as an automatic locking in that position of the closing part in which the spring-wound motor is prestressed, requires very high manufacturing expenditures and can therefore only be manufactured at high cost. Because of the guiding, coupling and driving elements arranged on both sides of the box, a sufficiently large lateral clearance is required in the installation space so that the container cannot simply be pushed flush into the installation space but must be fixed separately in it at a distance from the side walls of the installation space. For aesthetic reasons, the laterally remaining gaps in the installation opening must then be covered by additional cover parts.

In the case of a known container for food, bottles or the like (U.S. Patent Document US 54 00 914), the closing part consists of a basic frame which is placed on the opening edge of the box-shaped container, a cover frame which can be locked on the latter, and a sliding lid which is guided between the two frames in a longitudinally slidable manner and can pass through a slot in the fame leg extending transversely to the sliding direction in order to expose the container opening.

In the case of a box-type container for mounting in a motor vehicle known from German Patent Document DE 38 44 022 C1 having a compartment for paper tissues and a compartment for waste, the closing part has a sliding lid which reaches over the opposite exterior edges of the container opening and engages there in guide grooves extending on the longitudinal sides of the container. The compartment for waste is closed by means of a tilting cover, which can be folded open about a joint, which consists of a soft plastic material and is fixed on the exterior side of the container, in order to expose the compartment opening. When the tilting cover is closed, the sliding cover can be slid over the tilting cover in order to expose the opening of the compartment for the paper tissues.

The invention is based on the object of providing a container of the initially mentioned type which has a compact construction; which, for easy mounting, can be pushed into the installation opening in a laterally flush manner so that no additional fixing elements are required; and in which the closing part can be displaced with an easy motion and without any jamming.

This and other object have been achieved according to the present invention by providing a container for an installation into an installation opening in the interior of a vehicle, comprising: a box defining an upwardly-facing box opening; a sliding lid arranged to at least partially cover the box opening in a closed position; a guide plate arranged adjacent said sliding lid and partially covering the box opening, said sliding lid being displaceable in a sliding direction relative to said guide plate to at least partially expose the box opening in an open position, the guide plate having a transverse edge located opposite said sliding lid which extends transversely to said sliding direction and which is swivellably supported at least in a central portion on an upper edge of the box; a spring arranged to bias said guide plate in an upward swivelling direction with respect to said upper edge of the box; and a connecting link guide which slidably supports said sliding lid relative to said box.

The container according to the invention has the advantage that, because of the telescope-type construction of the closing part as a guide plate and a sliding lid with an end-side swivel bearing of the guide plate within the box opening and the parallel guiding of the sliding lid on the guide plate, which, in addition, is forcibly guided in a connecting link guide on the box, as well as by the spring loading of the guide plate such that the sliding lid is always placed against the upper guideway of the connecting link guide, the closing part forms a three-point-supported construction unit which is subjected to no installation bracing and can therefore not be hindered in any way in its sequence of movements. The whole guiding mechanism is situated within the box opening so that no movable parts of the closing part protrude on the container and the container can be inserted in a form-locking manner into the installation opening. The connecting link guide is freely designable and may, for example, have a linear or a curved dimension. As a result, the sliding path of the sliding lid can be individually adapted to the environmental conditions of the installation space.

The telescopic construction of the closing part also opens up the possibility of equipping the container, in the case of an extremely low construction, with an integrated spring-wound motor as well as with a detent device for locking the sliding lid on the guide plate when the spring motor is tensioned, which, according to a preferred embodiment of the invention are housed in the clearance between the top side of the guide plate and the bottom plate of the sliding lid which is parallel thereto. These structural elements are therefore also situated within the contour lines of the container and also do not project in a useful-space-reducing manner into the box interior.

According to certain preferred embodiment of the invention, the telescopic guiding of the sliding cover on the guide plate is implemented in a simple manner by means of two guide rails which each have one respective guide groove respectively and project in one piece on the underside of the sliding lid on its longitudinal edge, into which guide rails one of the longitudinal edges of the sliding cover respectively extending in the sliding direction. By means of these guide rails, a clearance is simultaneously created between the guide plate and the sliding cover, which clearance can be utilized for housing driving elements.

According to certain preferred embodiments of the invention, the connecting link guide has two connecting link grooves and two guide pins dipping or extending into the connecting link grooves. The connecting link grooves are placed in the side walls of the box which extend in parallel to the sliding direction of the sliding lid and are situated opposite one another, while the guide pins each project at a right angle from one of the longitudinal edges of the sliding lid which are in parallel to the sliding direction. On their end which is forward in the closing direction of the sliding lid, the connecting link grooves are each provided with an upwardly extending bent nose, into which the respectively assigned connecting link pin moves in the closing position of the sliding lid. As a result, on the one hand, a displacement path of the sliding lid is implemented which can be adapted to the installation conditions of the installation space and, on the other hand, in connection with the spring applied to the bottom side of the guide plate, a secure end position locking of the sliding lid is achieved so that the sliding lid remains in its closed position even in the case of a frontal crash. The unlocking takes place with the operation of the sliding lid, specifically the simultaneous downward and opening movement during the manual pushing-back of the sliding lid.

According to an advantageous embodiment of the invention, the resilient suspension of the guide plate on the box is implemented in a simple manner in that a box wall of the box, which is directed transversely to the sliding direction of the sliding lid, has at least one recess placed from the direction of the upper edge and the guide plate is swivellably fixed in this at least one recess by means of a finger projecting on the end side. The spring, which is preferably constructed as a leg spring and which is held on a cam projecting from the box wall, is supported by means of its one leg on the interior side of the box wall and by means of its other leg on the bottom side of the guide plate.

According to an advantageous embodiment of the invention, the sliding lid is acted upon by a closing force acting in the closing direction and, between the sliding lid and the guide plate, a detent device is provided which is effective in the opening position of the sliding lid and which automatically locks the sliding lid against the closing force. The detent device is constructed such that its locking can be released by a brief application of force to the sliding lid which acts in the opening direction.

According to another embodiment of the invention, two mutually engaging gear wheels are rotatably disposed between the guide plate and the closing lid and two parallel toothed racks are provided which mesh with one of the gear wheels respectively. Preferably, the gear wheels are arranged on the guide plate and the toothed racks are fastened on the bottom side of the sliding lid facing the guide plate. The closing force of the closing lid is generated by a coil spring which is coupled with a gear wheel and which is tensioned by means of the rotation of the gear wheel caused by way of the toothed rack during the displacement of the sliding lid into its opening position. A damping element, preferably a viscose brake, is coupled with the other gear rim, which viscose brake renders the opening movement of the sliding lid uniform by means of the relaxing coil spring. As the result of the two-dimensional arrangement of the spring-wound motor gear wheel and of the damping gear wheel and their engagement in the exterior tooth strips, not only an extremely low construction is achieved but also, in addition, a forced parallel guiding which prevents the sliding lid from coming in contact with the box walls or the connecting link pins of the sliding lid jam within the connecting link grooves on the box side walls, and therefore permits the allowance of larger manufacturing tolerances for the guide rails with guide grooves on the sliding lid.

Other objects, advantages and novel features of the present invention will become apparent from the following detailed description of the invention when considered in conjunction with the accompanying drawings.

BRIEF DESCRIPTION OF THE DRAWINGS

FIG. 1 is a longitudinal sectional view of a container according to a preferred embodiment of the present invention;

FIG. 2 is a rear view of the container in the direction of arrow II in FIG. 1.

DETAILED DESCRIPTION OF THE DRAWINGS

Figure 3:
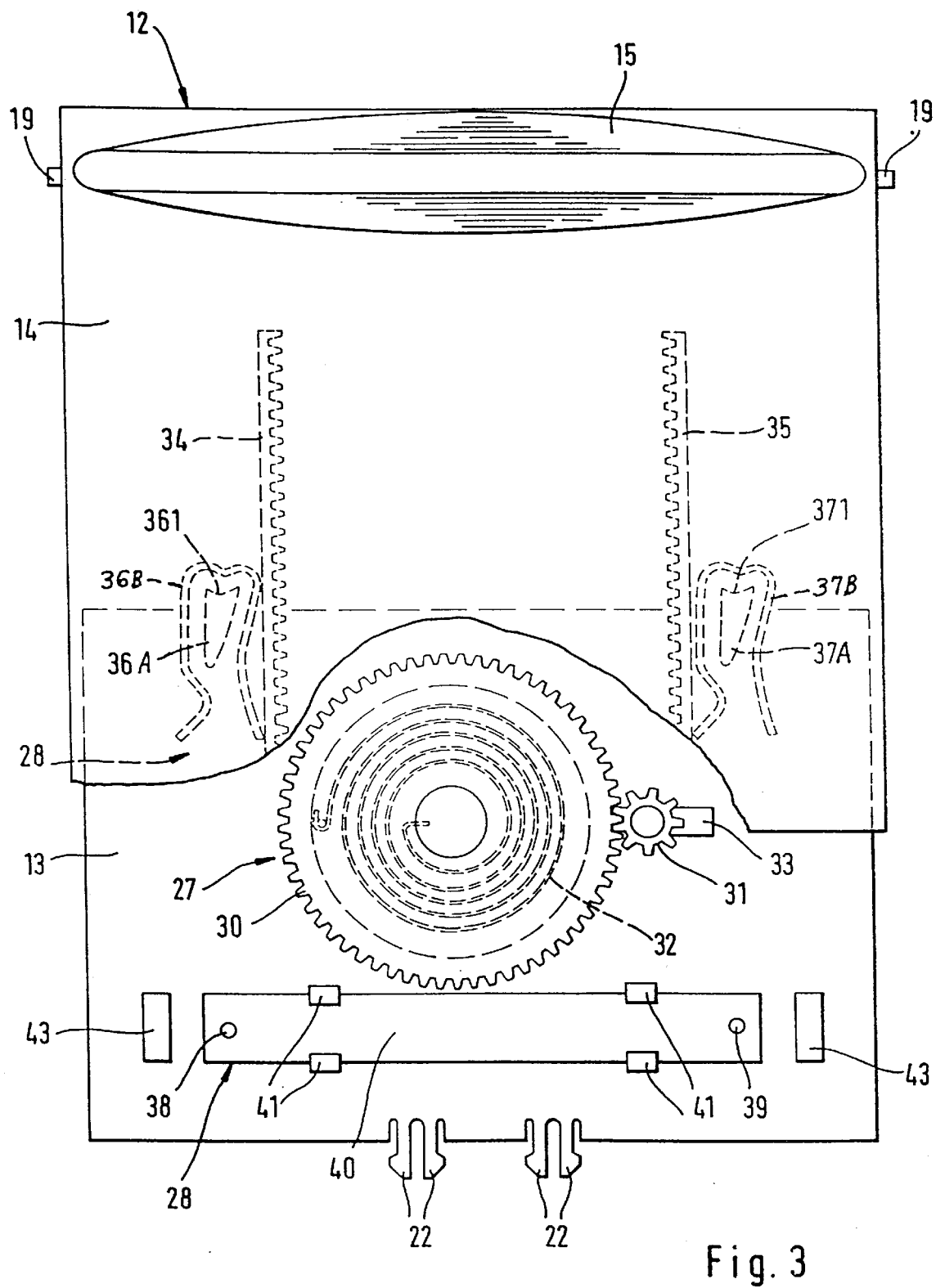
FIG. 3 is a top view of the closing part of the container of FIG. 1.

The container, which is illustrated in FIG. 1 as a longitudinal sectional view and in FIG. 2 as a rear view, is for the installation into an installation opening of a vehicle, particularly of a passenger car. It has a box 11 with a box opening 10 situated on top and a closing part 12 which covers the box opening 10 and with which the box opening 10 can be closed and partially exposed. The hollow box 11 is square and has a base plate 111, two parallel side walls 112 and a rearward and a forward transverse wall 113, 114. The base plate 111, the side walls 112 and the transverse walls 113, 114 are manufactured together from plastic in one piece.

The closing part 12, which is shown in a top view in FIG. 3, consists of a guide plate 13 and of a sliding lid 14 which can be displaced thereto in parallel and on the top side of which a gripping bar 15 is molded on along the forward transverse edge. The sliding lid 14 is guided on the guide plate 13 in the sliding direction, which is symbolized by means of an arrow 16 in FIG. 1, with play in each transverse direction to the sliding direction 16. For this purpose, the sliding lid 14, on its bottom side, has guide rails 17 (FIG. 2) which project therefrom in one piece, extend along its longitudinal edges extending in parallel to the sliding direction 16, and into which the respective longitudinally continuous guide groove 18 is machined. The width of the guide grooves 18 is constructed to be slightly larger than the plate thickness of the guide plate 13 so that, by means of its two longitudinal edges extending in parallel to the sliding direction 16, the guide plate 13 extends into the two mutually facing guide grooves 18 with play.

Furthermore, the sliding lid 14 carries two guide pins 19 (FIG. 3) which, close to the forward transverse edge of the sliding lid 14, project at a right angle from its longitudinal edges extending in parallel to the sliding direction 16. Together with two connecting link grooves 20 arranged on the box 11, the two connecting link pins 19 form a connecting link guide for the sliding lid 14. In this case, one connecting link groove 20 respectively is placed in the interior wall of the mutually opposite side walls 112 of the box 11 which extend in parallel to the sliding direction 16 of the sliding lid 14. FIG. 1 illustrates the one connecting link groove 20 on the one side wall 112 with a broken line. On its end which is forward in the closing direction of the sliding lid 14, each connecting link groove 20 is provided with an upwardly extending bent nose 201 into which the respectively assigned connecting link pin 19 moves in the closing position of the sliding lid 14.

The closing part 12 is situated inside the box opening 10 as a three-point-supported construction unit, in which case, in the closing position of the sliding lid 14, the top side of the sliding lid 14 is approximately flush with the top edge of the box 11. For implementing the three-point support, the rearward transverse wall 113 of the box 11, whose height is lower than that of the remaining box walls, has two recesses 21 placed from the direction of the upper edge of the transverse wall 113 which are arranged symmetrically to the wall center. The guide plate 13 carries on its rearward transverse edge facing away from the gripping bar 15, two pairs of fingers 22 which project beyond the transverse edge and which with a slight prestress rest in the two recesses 21 and, by means of molded-on detent noses, reach behind corresponding detent projections in the recesses 21. A holding strip 23, which covers one of the two recesses 21, is placed on the top edge of the rearward transverse wall 113 and is held by means of a countersunk screw 24 screwed into the rearward transverse wall 113. By means of the holding strip 23, the finger pairs 22 are prevented from moving out of the recesses 21 and provide the guide plate 13 with a certain swivellability in the vertical direction inside the box opening 10.

On the interior side of the rearward transverse wall 113 of the box 11, a holding cam 25 is molded on in one piece which receives a leg spring 26. By means of one of its spring legs, the leg spring 26 is supported on the interior side of the rearward transverse wall 113 and, by means of its other spring leg, it is supported on the bottom side of the guide plate 13 and presses the guide plate 13 in the upward direction; that is, away from the base plate 111 of the box 11. As a result, the connecting link pins 18 of the sliding lid 14 rest against the upper guideway of the connecting link grooves 20 under prestress and, in the closing position of the sliding lid 14, are pressed upward in the two bent noses 201. As a result, the closing part 12 swivels slightly upwards (FIG. 1 clockwise) in the closing position of the sliding lid 14, and the sliding lid 14 is locked on the box 11 so that, even in the event of a crash, the sliding lid 14 will not open automatically. The unlocking of the sliding lid 14 takes place by means of an obvious operation by the simultaneous downward and opening movement of the sliding lid 14 during the pushing back, for which the sliding lid 14 is to be gripped manually on the gripping bar 15.

In the closing direction, the sliding lid 14 is driven by a spring-wound motor 27 which, during the displacement of the sliding lid 14 to be carried out manually, is tensioned in its opening position. When the spring-wound motor 27 is tensioned, the sliding lid 14 is locked in its opening position by means of a detent device 28. The detent device 28 and the spring-wound motor 27 are housed in the clearance 29 existing between the bottom side of the sliding lid 14 and the top side of the guide plate 13, which clearance 29 is created by the guide rails 17 of the sliding lid 14 which reach laterally around the guide plate 13.

The spring-wound motor 27 has two gear wheels 30, 31 which are disposed on the guide plate 13 and have extremely different diameters; a coil spring 32 and a damping element 33 which is constructed as a known viscose brake. The two gear wheels 30, 31 are arranged transversely to the sliding direction 16 of the sliding lid 14 side-by-side and engage with one another. The gear wheel 30 with the large diameter has a pot-shaped construction and, in the interior of the pot, receives the coil spring 32 indicated in FIG. 3 by a broken line. The gear wheel 31 with the small diameter is coupled with the damping element 33.

On the bottom side of the sliding lid 14, two parallel toothed racks 34, 35 are arranged which are preferably molded in one piece on the sliding lid 14. The two toothed racks 34, 35 are aligned in parallel to the sliding direction 16 of the sliding lid 14, specifically such that, during the displacement, the toothed rack 34 meshes with the gear wheel 30 and the toothed rack 35 meshes with the gear wheel 31. The engagement points of the toothed racks 34, 35 and of the gear wheels 30, 31, in this case, are situated on the outside on sides of the gear wheels 30, 31 which face away from one another. When the sliding lid 14 is changed into its opening position, the coil spring 32 is tensioned by the rotation of the gear wheel 30 which is triggered in this case by way of the toothed racks 34, 35. When the sliding lid 14 is released again in its opening position, the coil spring 32 will drive the gear wheel 30 and this gearwheel pushes, by way of the toothed racks 34, 35, the sliding lid 14 back into its closing position. By means of the gear wheel 31 coupled with the damping element 33, which gear wheel 31 in this case engages with the toothed rack 35, the closing movement of the closing lid 14 is rendered uniform.

The detent device 28 for locking the sliding lid 14 in its open position when the coil spring 32 is tensioned consists of two heart-shaped connecting links 36A, 36B, and 37A, 37B which are molded to the bottom side of the sliding lid 14 and are known per se, and of two connecting link pins 38, 39 which are arranged on a detent slide 40 displaceable transversely to the sliding direction 16 and travel close to the opening position of the sliding lid 14 into the connecting links 36A, 36B and 37A, 37B. The detent slide 40 is displaceably guided between guide cams 41 molded in one piece to the guide plate 13. The displacement movement of the detent slide 40 is limited by two stops 43 which are fastened on the top side of the guide plate 13. The connecting link pins 38, 39 project at a right angle from the detent slide 40.

As the sliding lid 14 is moved to the open position, the connecting link pins 38, 39 are guided by the slots defined by the connecting links 36A, 36B, and 37A, 37B to a position in which they are aligned to be seated in the detent notches 361 and 371. Therefore, when the sliding lid 14 is released by the user in the open position, the connecting link pins 38, 39 rest against the detent notches 361, 371, and thus lock the sliding lid 14 in the open position against the spring-wound motor 27. In order to close the sliding lid 14, the user then applies a low force to the sliding lid 14 via the gripping bar 15 in the opening direction of the sliding lid 14, which causes the connecting pins 38, 39 to be slid in the slots defined between the connecting links 36A, 36B, and 37A, 37B (i.e., to the left as shown in FIG. 3) in order to move the connecting link pins 38, 39 out of alignment with the detent notches 361, 371. After releasing the sliding lid 14, the sliding lid 14 is then allowed to move into the closed position along the slots defined on the left side of the connecting links 36A, 36B, and 37A, 37B as shown in FIG. 3, due to a closing force provided by the coil spring 32.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A container for an installation into an installation opening in the interior of a vehicle, comprising:

a box defining an upwardly-facing box opening;

a sliding lid arranged to at least partially cover the box opening in a closed position;

a guide plate arranged adjacent said sliding lid and partially covering the box opening, said sliding lid being displaceable in a sliding direction relative to said guide plate to at least partially expose the box opening in an open position, the guide plate having a transverse edge located opposite said sliding lid which extends transversely to said sliding direction and which is swivellably supported at least in a central portion on an upper edge of the box;

a spring arranged to bias said guide plate in an upward swivelling direction with respect to said upper edge of the box; and a connecting link guide which slidably supports said sliding lid relative to said box.

2. A container according to claim 1, wherein the sliding lid includes a pair guide rails which extend along a respective pair of bottom longitudinal edges of the sliding lid parallel to the sliding direction, each of said guide rails defining a longitudinal guide groove which is open toward the inside facing the other of said guide rails, a pair of longitudinal edges of the guide plate projecting into said guide grooves, respectively.

3. A container according to claim 2, wherein said connecting link guide comprises two connecting link grooves which are arranged in mutually opposite transverse walls of the box extending parallel to the sliding direction of the sliding lid, and two guide pins which project perpendicularly from transverse longitudinal edges of the sliding lid into the connecting link grooves respectively.

4. A container according to claim 1, wherein said connecting link guide comprises two connecting link grooves which are arranged in mutually opposite transverse walls of the box extending parallel to the sliding direction of the sliding lid, and two guide pins which project perpendicularly from transverse longitudinal edges of the sliding lid into the connecting link grooves respectively.

5. A container according to claim 4, wherein said connecting link grooves bend upwardly at a bent portion corresponding to said closed position of the sliding lid, said guide pins being moved upwardly in said bent portion when the sliding lid is moved into said closed position.

6. A container according to claim 1, wherein said upper edge of the box is aligned transversely to the sliding direction of the sliding lid and defines at least one recess, the guide plate further comprising a t least one finger projecting on an end side, said finger being swivellably connected in the at least one recess.

7. A container according to claim 1, wherein the sliding lid is biased by a closing force acting in a closing direction, and a detent device is provided between the sliding lid and the guide plate, said detent device operating in the open position of the sliding lid to automatically lock the sliding lid against the closing force, the detent device being constructed such that said locking is releasable by application of a force to the sliding lid acting in the opening direction of the sliding lid.

8. A container according to claim 7, wherein the detent device has at least one heart-shaped connecting link, and a corresponding connecting link pin which slides along the connecting link, the connecting link and the connecting link pin being arranged on mutually facing surfaces of the sliding lid and the guide plate, the connecting link pin being fastened on a detent slide which is supported to be slidable in a direction perpendicular to said sliding direction of the sliding lid.

9. A container according to claim 8, wherein the at least one heart-shaped connecting link is molded to a bottom side of the sliding lid facing the guide plate in one piece, and the detent slide with the at least one connecting link pin being transversely displaceably arranged on a top side of the guide plate facing the sliding lid.

10. A container according to claim 1, wherein two mutually engaging gear wheels are disposed between the guide plate and the sliding lid in a rotatable manner, and two parallel toothed racks are arranged which mesh with the gear wheels, said closing force being generated by a coil spring which is coupled with one of the gear wheels and which is tensioned by rotation of the gear wheel via the toothed racks during displacement of the sliding lid into its open position.

11. A container according to claim 10, wherein the two gear wheels are arranged on the guide plate adjacent each other transversely to the sliding direction of the sliding lid, and the toothed racks are fastened on a bottom side of the sliding lid facing the guide plate.

12. A container according to claim 10, wherein a diameter of the gear wheel coupled with the coil spring is larger than a diameter of the other gear wheel, the gear wheel with the smaller diameter being coupled with a damping element.

13. A container according to claim 12, wherein said damping element is a viscose brake.

14. A container according to claim 10, wherein said one of the gear wheel which is coupled with the coil spring is constructed in a pot shape and the coil spring is received in the gear wheel.

* * * * *